W. C. & C. R. MARTINEAU.
TIRE.
APPLICATION FILED OCT. 2, 1916.
1,255,903.
Patented Feb. 12, 1918.
2 SHEETS—SHEET 1.
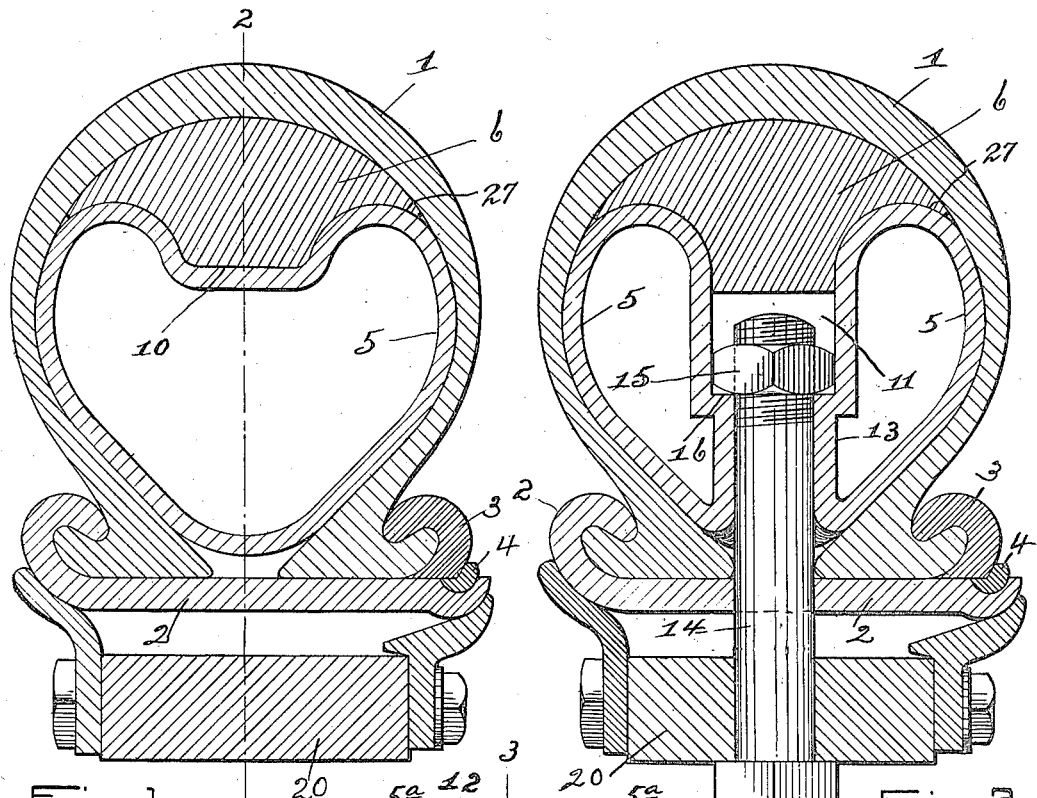
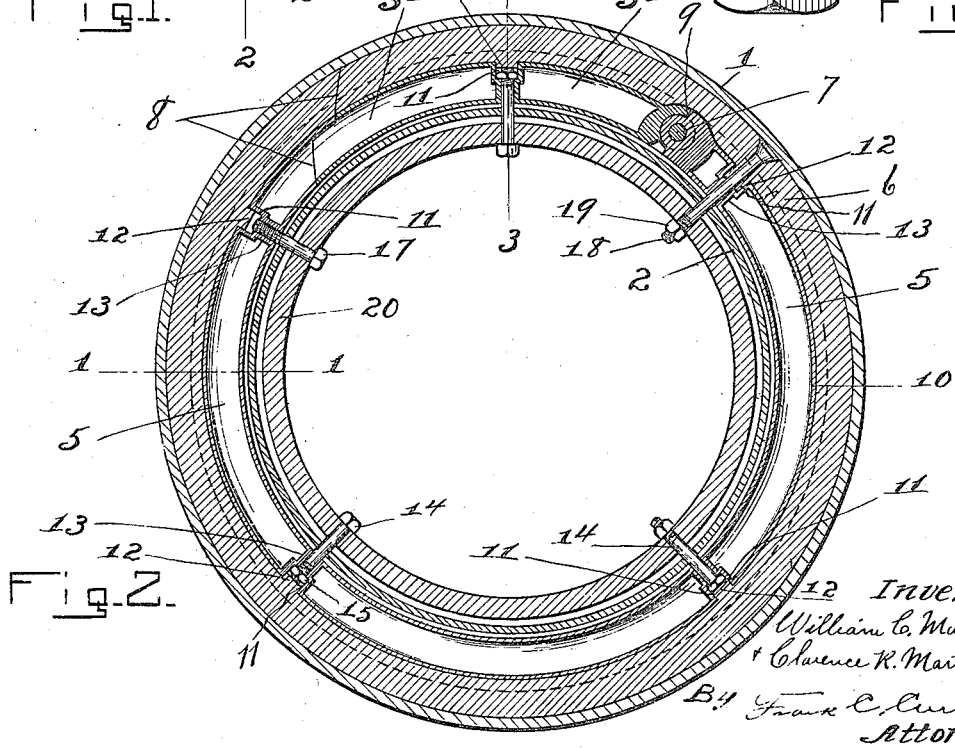
Inventors
William C. Martineau
& Clarence R. Martineau
By Frank C. Curtis
Attorney W. C. & C. R. MARTINEAU.
TIRE.
APPLICATION FILED OCT. 2, 1916.
1,255,903.
Patented Feb. 12, 1918.
2 SHEETS—SHEET 2.
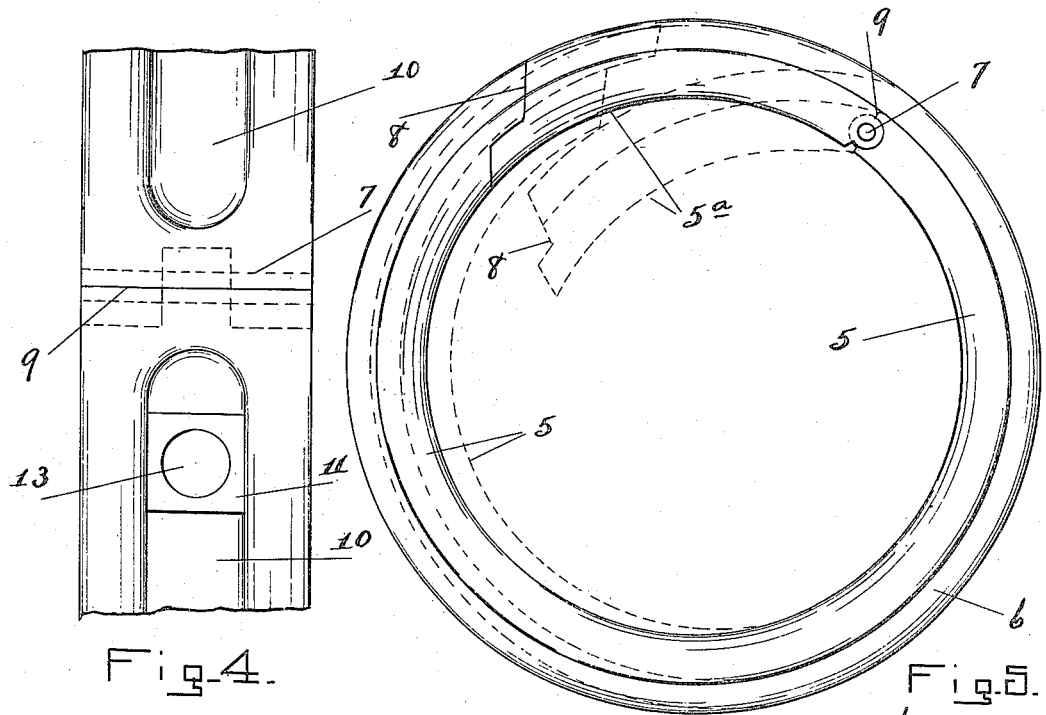
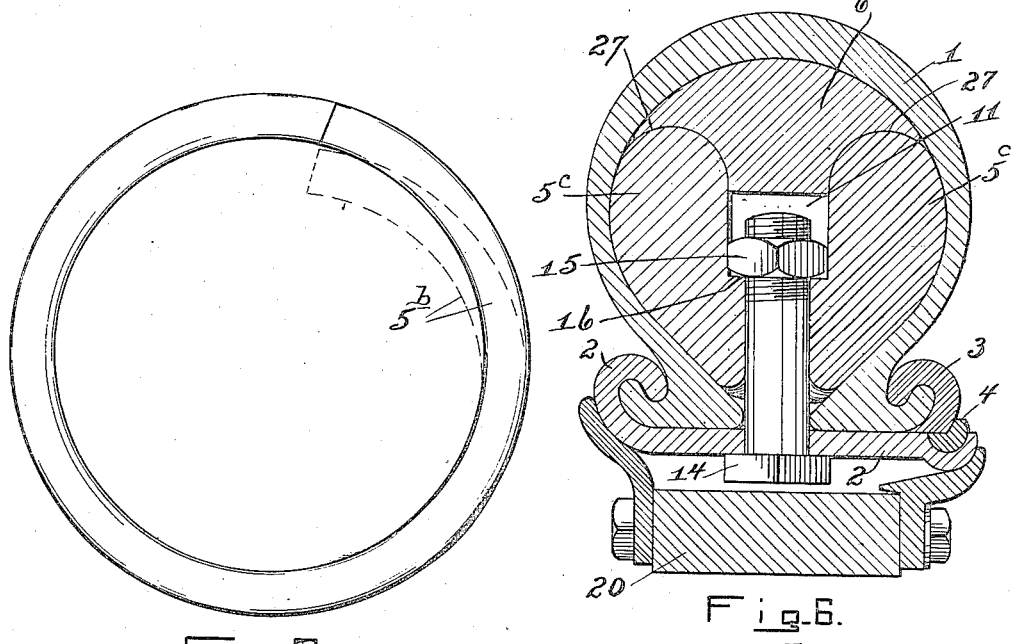
Inventors
William C. Martineau
& Clarence R. Martineau
By Frank C. Curtis
Attorney

UNITED STATES PATENT OFFICE.

WILLIAM C. MARTINEAU AND CLARENCE R. MARTINEAU, OF ALBANY, NEW YORK.

TIRE.

1,255,903. Specification of Letters Patent. Patented Feb. 12, 1918.

Application filed October 2, 1916. Serial No. 123,243.

*To all whom it may concern:*

Be it known that we, WILLIAM C. MARTINEAU and CLARENCE R. MARTINEAU, citizens of the United States, residing at Albany, county of Albany, and State of New York, have invented certain new and useful Improvements in Tires, of which the following is a specification.

Reference may be had to the accompanying drawings, and the reference characters marked thereon, which form a part of this specification.

Our invention relates to tires for road vehicles.

The principal object of the invention is to convert an ordinary pneumatic tire into a cushion-tire.

Other objects will appear in connection with the following description.

Figure 1 of the drawings is a cross-section in a radial plane of an ordinary pneumatic tire converted into a cushion-tire by means of our invention, the section being taken on the broken line 1—1 in Fig. 2.

Fig. 2 is a view in section of the same taken on a plane extending centrally of the tire at right angles to its axis, the plane of the section being indicated by the broken line 2—2 in Fig. 1.

Fig. 3 is a section similar to Fig. 1, taken on the broken line 3—3 in Fig. 2.

Fig. 4 is a plan view of the hinge-portion of the core broken-away.

Fig. 5 is a side view of the core removed, illustrating in dotted lines the manner in which the core is contracted to permit of its insertion within the shoe.

Fig. 6 is a view similar to Fig. 3, showing certain modifications of the invention.

Fig. 7 is a view similar to Fig. 5, showing a one-piece core.

Referring to the drawings wherein the invention is shown in preferred form, 1 is the shoe of an ordinary pneumatic tire, and 2 is a rim upon which the shoe is adapted to be mounted.

The rim, 2, may be a demountable rim or a permanent part, as the felly, of a wheel, and may be one-piece or built-up as may be desired.

In Figs. 1 and 3, we have shown a built-up rim having a removable keeper-ring or flange, 3, detachably held in place by a locking ring, 4.

The shoe may be of any of the usual types, the quick detachable clencher type being shown in the drawings.

In carrying out our invention we remove from the pneumatic tire the ordinary inner tube and insert within the shoe a circular core, 5—5ª with a body of elastic material, 6, interposed between the outer periphery of the core and the shoe.

We have shown in Figs. 1, 2 and 3, the core as made of a hollow casting of metal, preferably aluminum, and as preferably made in two complementary segments of different lengths, the smaller being approximately one-fifth the circular extent of the core.

One end of this shorter segment, 5ª, is connected with one end of the longer segment, 5, by means of a hinged joint, 7, its other end being adapted to make a stepped engagement with the other end of the longer segment at 8.

The members of the hinged joint, 7, are formed with shoulders, 9, adapted to abut against each other when the shorter segment is swung into circular alinement with the larger segment.

The body, 6, is made of suitable elastic material, preferably sponge-rubber, and is preferably seated in a groove, 10, in the outer periphery of the core, as shown, the core and the body of elastic material together substantially filling the interior of the shoe, 1.

At intervals, the core is formed with radial pockets or wells, 11, formed in the bottom of the groove, 10; and the body of elastic material is formed with suitable dowels, 12, adapted to occupy the respective pockets or wells, 11, and serving to prevent circumferential creeping of the elastic material relatively to the core.

The pockets or wells, 11, are preferably formed by hollow radial posts, 13, integral with the respective core-segments, which posts are adapted to be engaged by suitable screw-mechanism passing through the rim, 2.

We have shown a screw-bolt, 14, passing outward through a suitable aperture in the rim with its outer end in engagement with a nut, 15, seated in the bottom of one of the pockets or wells, 11, which nut engages a shoulder, 16, on the interior of the post, 13. It will be understood, of course, that the nut and the head of the bolt can be in reversed position from that shown.

We have shown one of the posts interiorly screw-threaded and a screw-bolt, 17, inserted through the rim engaging the screw-threaded interior of the post.

We have also shown a screw-bolt, 18, inserted inwardly through a countersunk aperture in the elastic body, 6, and one of its dowels, 12, through the hollow post and rim, and secured by means of a nut, 19.

The heads of the several bolts, 14, may be located in a recess or space between the rim, 2, and the body of the felly, as shown in Fig. 6; or the respective bolts may pass entirely through the felly, as shown in Fig. 3, serving not only as a means for bolting the core to the rim, but also as a means for bolting the rim to the felly.

In converting a pneumatic tire into a cushion-tire by means of our invention, the shoe is removed from the rim, and the inner tube is removed from the shoe. The core is then contracted by swinging inward the short segment 5ª and springing toward each other the ends of the longer segment 5, as shown in Fig. 5, permitting the core in this contracted form to be inserted within the shoe. The core is then permitted to expand and the short segment 5ª is swung outward into circular alinement with the longer segment, as shown in Fig. 2. The shoe with its contained core is then reapplied to the rim forming a cushion-tire for the wheel.

Our invention makes it possible to use and obtain long service from shoes defective through faults in manufacture, as well as shoes which have been so worn or punctured as to be unsuitable for further use in pneumatic tires.

In the preferred form of our invention the outer circumferential portions of the core are substantially rounded or convexed in cross-section on opposite sides of the groove, 10, as shown at 27, and the body of rubber, 6, is tapered in cross-section from its middle portion which occupies the groove, 10, toward each of its side edges, said tapered portions being concaved on their inner sides to conform to said convexed edge-portions of the core, whereby the body of rubber substantially fills the space between the core and the shoe without presenting any sharp corners or edges of the core to the shoe. The shoe, the interior of which is of general circular form in cross-section, is thus yieldingly supported by the body of rubber not only along its extreme circumferential tread-portion, but for a substantial distance on either side thereof, whereby side-thrust upon the tire is relieved by the rubber-cushion.

The outer surface of the body of rubber being thus convexed in cross-section concentrically with the interior of the shoe, and its tapered portions being concaved in cross-section eccentrically to the interior of the shoe as shown, the outer surface of said rubber body will merge with the side surface of the core to make substantially continuous contact with the inner side of the shoe, thus providing unbroken support for the shoe.

While we have shown and described the core as preferably made hollow and in segments and grooved to receive the body of rubber, we do not wish to be limited to these characteristics of the core for all purposes of the invention, as various obvious changes can be made in the construction of the core without departing from the spirit and scope of the invention as set forth in the appended claims.

Thus in Fig. 6 we have shown a solid core, 5ᶜ, instead of a hollow core, and in Fig. 7 we have shown an integral core, 5ᵇ.

Where the bolts, 14, are inserted inwardly through the core the bolts are inserted before the rubber body, 6, is applied. The rubber body, 6, and the shoe are then applied but the shoe is left free along its beaded edge which engages the keeper-ring, 3, permitting the shoe to yield outwardly to outward pressure applied to the bolts whereby the bolts are forced outwardly a sufficient distance to permit them to enter the apertures in the rim, 2.

What we claim as new and desire to secure by Letters Patent—

1. The combination with a rim; of a flexible hollow shoe mounted upon the rim; a core; a body of elastic material interposed between the outer periphery of the core and the shoe, said core and elastic material substantially filling the interior of the shoe; and connections between the rim, body of elastic material and core passing through the rim and in countersunk engagement with said body of elastic material.

2. The combination with a rim; of a flexible hollow shoe mounted upon the rim; a core having an inwardly movable segment; a body of elastic material interposed between the outer periphery of the core and the shoe; and a plurality of connections between the rim and the core, one of said connections being between the rim and said inwardly movable segment.

3. The combination with a rim; of a flexible hollow shoe mounted upon the rim; and means substantially filling the space within said shoe and substantially wholly inclosed by the shoe, said means including a member having an inwardly movable segment; and a plurality of connections between the rim and said shoe-inclosed means, one of said connections being between the rim and said inwardly movable segment.

4. A tire comprising a flexible shoe, a circular core inclosed by the shoe and having a hinged segment adapted to swing inwardly to permit contraction of the core, and a body of elastic material interposed between the outer periphery of the core and the shoe.

5. The combination with a rim; of an elastic shoe mounted on the rim, a hollow core inclosed by the shoe and having at intervals hollow radial posts; connections between the core and the rim extending through the rim and said hollow posts; and a body of elastic material interposed between the outer periphery of the core and the shoe.

In testimony whereof, we have hereunto set our hands this 21st day of September, 1916.

WILLIAM C. MARTINEAU.
CLARENCE R. MARTINEAU.